United States Patent [19]

Peterson et al.

[11] 4,110,603
[45] Aug. 29, 1978

[54] PLASTIC PIPE HEATER

[75] Inventors: Jerry D. Peterson, Conrad; Gerald L. Knief, Grundy Center, both of Iowa

[73] Assignee: Ritchie Industries, Inc., Conrad, Iowa

[21] Appl. No.: 706,392

[22] Filed: Jul. 19, 1976

[51] Int. Cl.² .................. E03B 7/10; F16L 53/00; H05B 3/06
[52] U.S. Cl. ................................ 219/535; 119/73; 137/341; 138/33; 219/301; 219/311; 219/342; 219/531; 219/536
[58] Field of Search .............. 219/280, 281, 296, 301, 219/311, 520, 526, 535, 536, 538, 542, 546, 552, 339, 342, 355, 527, 532, 347, 343; 137/341; 138/33; 119/73

[56] References Cited

U.S. PATENT DOCUMENTS

| | | | |
|---|---|---|---|
| 877,154 | 1/1908 | Wood, Jr. | 219/535 |
| 1,140,864 | 5/1915 | Aubery | 219/535 |
| 1,183,949 | 5/1916 | Burdick | 219/526 |
| 1,492,821 | 5/1924 | Weinbach | 219/535 |
| 1,499,502 | 7/1924 | Carmean | 219/536 |
| 1,638,353 | 8/1927 | Maxson | 219/525 |
| 2,426,976 | 9/1947 | Taulman | 219/535 |
| 2,459,816 | 1/1949 | Handley | 219/311 |
| 2,786,125 | 3/1957 | Drugmand et al. | 219/535 |
| 2,956,146 | 10/1960 | Weinman | 219/311 |
| 3,278,722 | 10/1966 | Fannon, Jr. et al. | 219/347 |
| 3,444,357 | 5/1969 | Drugmand | 219/535 |
| 3,900,047 | 8/1975 | Heppell | 138/33 |

Primary Examiner—J. V. Truhe
Assistant Examiner—Bernard Roskoski
Attorney, Agent, or Firm—Olson, Trexler, Wolters, Bushnell & Fosse, Ltd.

[57] ABSTRACT

A U-shaped heating element is attached to a bracket having an elongated back portion and ear portions joined normal to each end of the back portion. The ear portions extend to the same side of the back portion, and each ear portion has a plurality of perforations formed therethrough and a V-shaped recess formed in the extended free end thereof. The heating element is affixed to the back portion and disposed on the same side of the back as the ear portions. Plastic pipe is received in the V-shaped recesses of the ear portions, and springs hold the bracket to the pipe.

5 Claims, 5 Drawing Figures

PLASTIC PIPE HEATER

BACKGROUND OF THE INVENTION

This invention relates to heating apparatus. More particularly, this invention relates to apparatus which are used for thawing out frozen pipes or for keeping pipes from freezing in cold weather. Outdoor installations in general frequently have pipes which are above ground or adjacent the ground surface and therefore exposed to the weather and liable to freeze during cold spells. Livestock watering facilities are an example of such outdoor installations.

Apparatus currently in use for keeping pipes of outdoor installations, such as livestock watering fountains, from freezing employ electrical heating elements. The heating elements are placed directly against the pipe or directly against a structure disposed against the pipe, which structure conducts heat to the pipe. Widespread employment of plastic pipe in the plumbing field has resulted in the use of such pipe in livestock watering fountains and other outdoor installations. Current heating apparatus cannot be used on the plastic pipe without risking severe damage to the pipe.

SUMMARY OF THE INVENTION

A plastic pipe heater has a bracket structure. The bracket structure includes an elongated back portion and ear portions joined normal to each end of the back portion. Both ear portions project to the same side of the back portion. Each ear portion has a plurality of perforations formed therethrough and a recess formed in the extended free end thereof. The bracket has a plurality of tabs formed from the back portion and extending to the same side of the back as the ear portions. The plastic pipe is received into the recesses, and springs hold the bracket to the pipe.

A U-shaped electric heating element is detachably affixed to the back portion of the bracket, being held thereon by the tabs. The heating element is disposed to the same side of the back portion as the tabs and ear portions. Actuation of the heating element results in radiation of heat to the pipe.

It is an object of this invention to provide a plastic pipe heater which can be economically manufactured.

Another object of this invention is to provide a pipe heater which effectively and efficiently accomplishes the heating of plastic pipe without causing damage to the pipe, thereby enabling the usage of plastic pipe in outdoor installations such as animal watering fountains by ensuring free-flowing water in cold weather conditions.

Still another object of this invention is to provide a pipe heater which is readily adpatable to a wide range of pipe sizes.

A further object of this invention is to provide a pipe heater which is easily movable to different locations along the length of a pipe and easily attachable to and detachable from a pipe, even in confined areas.

These objects and other features and advantages of the plastic pipe heater of this invention will become readily apparent upon referring to the following description, when taken in conjunction with the appended drawing.

BRIEF DESCRIPTION OF THE DRAWING

The plastic pipe heater of this invention is illustrated in the drawing wherein.

DESCRIPTION OF THE PREFERRED EMBODIMENT

Figure 2:
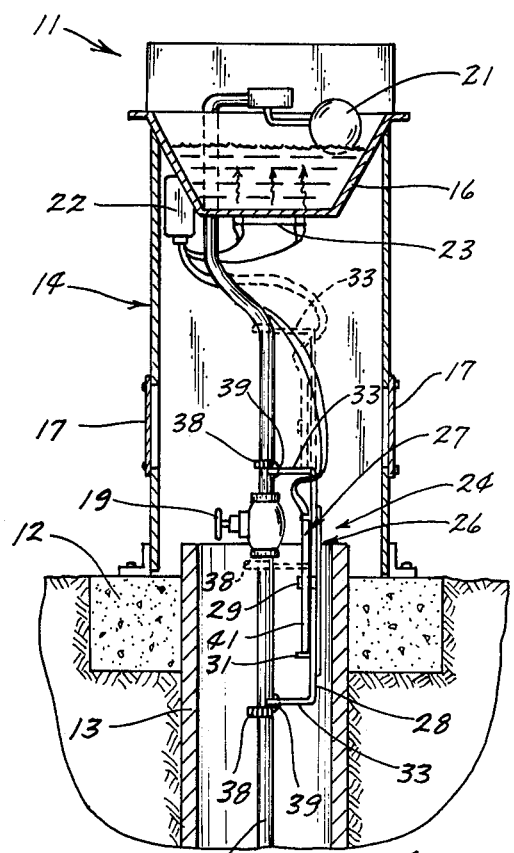
FIG. 2 is a reduced, elevational view of the plastic pipe heater attached to the plastic pipe water supply for a fountain, parts of the fountain being shown in section for greater clarity.

An animal watering fountain installation is generally indicated at 11 in FIG. 2. A concrete foundation 12 is disposed in the ground, and tile 13 extends perpendicularly therethrough into the ground. The fountain is indicated generally at 14 in FIG. 2 and is attached, as by angle irons and bolts, to the concrete foundation 12 and over the tile 13.

The fountain 14 includes at the upper portion thereof a water trough 16. Access doors 17 are provided in the sides of the fountain 14. A plastic pipe water supply 18 extends upwardly through the tile 13 to the fountain 14. A shut-off valve 19 is interposed in the plastic pipe 18 adjacent the upper opening of the tile 13. A float valve 21 is attached to the upper end of the plastic pipe 18 and is disposed within the trough 16.

A junction box 22 is attached to the interior of the fountain 14. The junction box 22 is connected to a power source (not shown) and has conductors leading therefrom to a heating element 23 affixed to the underside of the trough 16. The junction box 22 also is coupled by conductors to the plastic pipe heater 24 of this invention.

Figure 1:
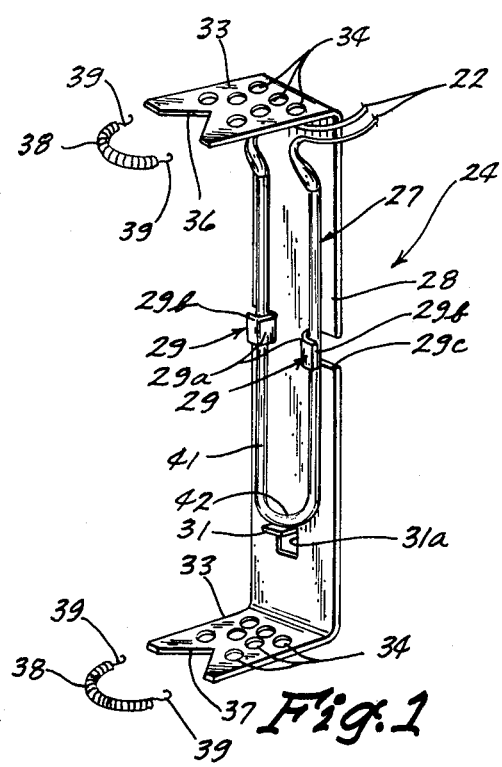
FIG. 1 is a perspective view of the plastic pipe heater shown detached from a hose or plastic pipe.

The plastic pipe heater 24 is indicated generally at 24 in FIG. 1. The heater 24 includes more particularly a support bracket structure 26 and a heating element structure 27. The bracket structure 26 is continuously formed and generally C-shaped (FIGS. 1 and 3) and includes an elongated back portion 28. A pair of tabs 29 are formed from the back portion 28 intermediate the ends thereof. The tabs 29 (FIG. 5) are L-shaped in cross section, first portions 29a of the tabs 29 being formed normal to and extending to the same side of the back 28, and second portions 29b of the tabs 29 being formed normal to the first portions 29a, disposed parallel to the back 28 and oppositely directed. The portions 29a, and 29b are parallel to the longitudinal edges of the back 28. Notches or recesses 29c are created in the back 28 by formation of the tabs 29. The back portion 28 has a lower tab 31 (FIGS. 1, 3 and 5) formed therefrom which is disposed intermediate the longitudinal edges of the back 28. The lower tab 31 is normal to the back and defines a plane normal to the longitudinal edges of the back 28. A rectangular aperture 31a is created in the back 28 by formation of the tab 31. The tabs 29, 31 extend to the same side of the back 28. An elongated reinforcing rib 32 (FIGS. 3, 4 and 5) is formed on the back 28 and is disposed on the opposite side of the back 28 from the tabs 29, 31. The reinforcing rib 32 is disposed parallel to and intermediate the longitudinal edges of the back portion 28.

Figure 3:
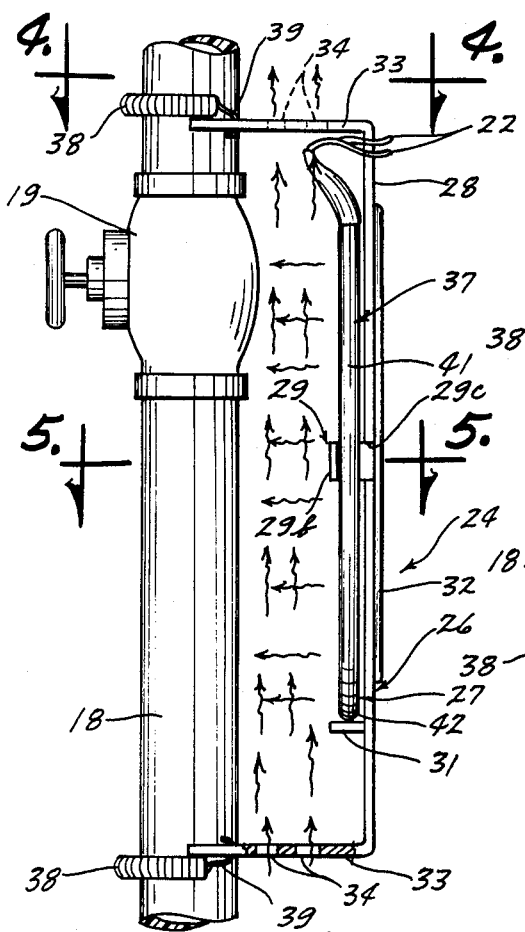
FIG. 3 is an enlarged elevational view of the plastic pipe heater attached to the water supply for a fountain, part of the bracket of the heater being in section to more clearly show the perforations thereof.
Figure 4:
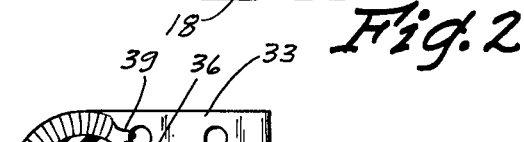
FIG. 4 is a cross sectional view taken along line 4—4 of FIG. 3.
Figure 5:
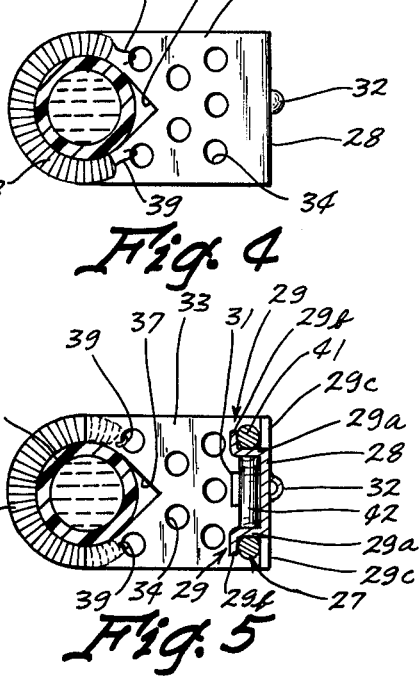
FIG. 5 is a cross sectional view taken along line 5—5 of FIG. 3.

Formed normal to each end of the back portion 28 are upper and lower ear portions 33 of the support bracket 26 (FIG. 3). The ear portions 33 extend to the same side of the bracket 26 as the tabs 29, 31, the lower tab 31 being disposed between the tabs 29 and the lower ear portion 33. Both of the ear portions 33 have a plurality of apertures or perforations 34 formed therethrough (FIGS. 4 and 5). V-shaped recesses, 36 and 37 are formed in the extended free ends of both of the ear portions 33. The support bracket structure 26 also includes a pair of extension springs 38. The extension springs 38 have hook portions 39 formed at both ends thereof. The hook portions 39 engage the perforations 34 of the ear portions 33.

The heating element 27 of the plastic pipe heater 24 (FIG. 1) is substantially U-shaped, having a pair of parallel straight portions 41 being joined together at one end by an arcuate portion 42 and at the opposite end being coupled by conductors to the junction box 22. The heating element 27 is detachably affixed to the support bracket structure 26, the element 27 being supported by the tabs 29, 31. As shown in FIGS. 3 and 5, the arcuate portion 42 rests upon the lower tab 31, and the straight portions 41 are caught by the tabs 29. The heating element 27 rests against the back portion 28. The heating element 27 is resilient such that the straight portions 41 can be temporarily bent apart to facilitate attachment to or detachment from the bracket 26.

When the plastic pipe heater 24 is to be used, the heater 24 is easily passed through an access door 17 of the water fountain 14. The support bracket structure 26 is pressed against the plastic pipe 18, the pipe 18 being received within the recesses 36 or 37 of the ear portions 33. Where the pipe 18 is vertically disposed, the bracket 26 is oriented such that the lower tab 31 and the arcuate portion 42 are disposed downwardly. The hook portions 39 are made to engage perforations 34 of the ear portions 33, and the springs 38 hold the support bracket 26 against the pipe 18. The heating element 27 is thereby positioned adjacent the pipe 18.

The heater element 27 is actuated by the passage of current therethrough, resistance to the current causing heat to be radiated therefrom, as illustrated in FIG. 3. The pipe 18 is warmed by the radiated heat such that water continues to flow freely therethrough even during cold weather conditions. A thermostat (not shown) affixed to the fountain 14 controls the actuation of the heating element 27. The perforations 34 maximize the radiation of heat from the ear portions 33 to keep the portions 33 cool and minimize the conduction of heat from the support bracket 26 to the pipe 18. The plastic pipe 18 in this way is protected against being heated to damaging temperatures.

As shown by hatched lines in FIG. 2, the plastic pipe heater 24 may be slid along the length of the pipe 18 to any desired location, the resiliency of the extension springs 38 allowing such movement. Movement of the pipe heater 24 from one location to another location upon the pipe 18 can also be accomplished by disengaging one hook portion 39 of each of the springs 38 from the respective ear portions 33 to detach the heater 24 from the pipe 18 and then reengaging the hook portions 39 after the placement of the heater 24 has been changed. The hook portions 39 of the springs 38 may engage any of the perforations 34, and the pipe heater 24 thereby can be adjusted to securely but slidably fit plastic pipe 18 of different sizes. When V-shaped recesses 37 are employed, the pipe heater 24 may be securely held to pipes 18 having a wide range of diameters, wobbling of the pipe heater 24 about the pipe 18 being prevented by the pipe 18 touching each of the recess portions 37 at two places.

It can be seen from the foregoing that the manufacture of the plastic pipe heater 24 can be economically accomplished. The heating of plastic pipe 18 is accomplished without damaging the pipe 18, and free-flowing water is assured during cold weather conditions. Outdoor installations employing plastic pipe 18, such as animal watering fountains 14, are thereby rendered efficiently operable the year round. The plastic pipe heater 24 is readily adaptable to pipes 18 having a wide range of diameters, it easy to attach or detach from a pipe 18 even in confined areas, and is conveniently movable from one location to another upon a pipe 18. The spacer rib 32 prevents, in very cramped spaces, the entire surface of the back portion 28 from touching the tile 13, thereby preventing the tile 13 from drawing off a substantial amount of the heat produced by the heating element 27. Thus it can be seen that the objects of this invention have been attained.

Although a preferred embodiment and modification thereof have been disclosed herein, it is to be remembered that various modifications and alternate constructions can be made thereto without departing from the full scope of the invention, as defined in the appended claims.

I claim:

1. A heater for use with plastic pipe, said heater comprising:
   a heating element; and
   support means for reducing conduction of heat, said support means including a back portion and ear portions, said heating element being attached to said back portion, said ear portions extending from said back portion and being disposed on the same side of said back portion, each ear portion at the extended free end thereof having a V-shaped recess formed therein, the pipe being received within said recesses when said support means is affixed to the pipe, said heating element being held in spaced relationship to the pipe by said support means, said heating element upon actuation radiating heat, each ear portion intermediate the ends thereof having a plurality of perforations formed therethrough whereby conduction of heat from said heating element to the pipe is reduced and the pipe is warmed by radiated heat.

2. A heater as defined in claim 1 and further wherein a plurality of tabs are formed from said back portion, said tabs being disposed on the same side of said back portion as said ear portions, said heating element being held upon said back portion by said tabs.

3. A heater as defined in claim 1 and further wherein said support means includes spring members, each spring member being associated with one of said ear portions, each spring member at each end thereof having hook portions, each hook portion engaging one of said perforations, said spring members extending around the plastic pipe, whereby said support means is adjustably held to the plastic pipe.

4. A heater as defined in claim 1 and further wherein said back portion has a reinforcing rib, said reinforcing rib being disposed on and extending from the opposite side of said back portion from said ear portions.

5. A heater as defined in claim 2 and further wherein said ear portions are affixed to opposite ends of said back portion, said support means being substantially U-shaped in conformation.

* * * * *